(12) United States Patent
Taniguchi

(10) Patent No.: US 8,194,935 B2
(45) Date of Patent: Jun. 5, 2012

(54) IMAGE PROCESSING APPARATUS AND METHOD

(75) Inventor: Hidenori Taniguchi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1105 days.

(21) Appl. No.: 11/531,915

(22) Filed: Sep. 14, 2006

(65) Prior Publication Data

US 2007/0122006 A1 May 31, 2007

(30) Foreign Application Priority Data

Sep. 16, 2005 (JP) .................................. 2005-270407

(51) Int. Cl.
*G06K 9/00* (2006.01)
*G06K 9/68* (2006.01)

(52) U.S. Cl. ........ 382/116; 382/115; 382/117; 382/118; 382/155

(58) Field of Classification Search .................. 382/116, 382/115, 117, 118, 155
See application file for complete search history.

(56) References Cited

U.S. PATENT DOCUMENTS

| | | | | |
|---|---|---|---|---|
| 5,649,070 | A * | 7/1997 | Connell et al. .................. | 706/14 |
| 6,697,505 | B2 * | 2/2004 | Yamaguchi et al. .......... | 382/118 |
| 7,020,308 | B1 * | 3/2006 | Shinzaki et al. .............. | 382/124 |
| 7,039,222 | B2 * | 5/2006 | Simon et al. .................. | 382/118 |
| 7,059,516 | B2 * | 6/2006 | Matsuyama et al. .......... | 235/382 |
| 7,403,642 | B2 * | 7/2008 | Zhang et al. .................. | 382/118 |
| 7,519,200 | B2 * | 4/2009 | Gokturk et al. ............... | 382/118 |
| 2002/0126880 | A1 * | 9/2002 | Dobashi ........................ | 382/118 |
| 2003/0118216 | A1 * | 6/2003 | Goldberg ...................... | 382/115 |
| 2004/0008872 | A1 * | 1/2004 | Goldberg ...................... | 382/115 |
| 2004/0156535 | A1 * | 8/2004 | Goldberg et al. ............. | 382/115 |
| 2004/0207743 | A1 * | 10/2004 | Nozaki et al. ............. | 348/333.12 |
| 2004/0247177 | A1 * | 12/2004 | Rowe et al. ................... | 382/159 |
| 2004/0264780 | A1 * | 12/2004 | Zhang et al. .................. | 382/224 |
| 2006/0239515 | A1 * | 10/2006 | Zhang et al. .................. | 382/118 |
| 2006/0245624 | A1 * | 11/2006 | Gallagher et al. ............ | 382/118 |

FOREIGN PATENT DOCUMENTS

| | | |
|---|---|---|
| JP | 11-175730 | 7/1999 |
| JP | 2001-84274 | 3/2001 |
| JP | 2002-170104 A | 6/2002 |
| JP | 2002-170119 | 6/2002 |
| JP | 2003-150617 | 5/2003 |
| JP | 2004-310287 | 11/2004 |
| JP | 2004-320287 | 11/2004 |

OTHER PUBLICATIONS

Computer translation of JP2004-310287.
Yamaguchi et al., "Updating Face Dictionary against Temporal Change", Journal of Institute of Electronics, Information and Communication Engineers, Japan, vol. 99, No. 118, p. 43-50. (Abstract in English language, remainder in Japanese), (1999).

* cited by examiner

*Primary Examiner* — Michael A Newman
(74) *Attorney, Agent, or Firm* — Carter, DeLuca, Farrell & Schmidt LLP

(57) ABSTRACT

Plural kinds of feature information for identifying an object and a period of time, set for each kind of the feature information, for which the feature information is effective are stored in connection with each other. A feature is extracted from image data, the extracted feature is compared with the feature information, which is within the set period of time, among the stored feature information, and an object is recognized.

11 Claims, 10 Drawing Sheets

| REGISTRATION ID (M) | SUBFOLDER (m) | FILE (n) |
|---|---|---|
| 1 : PERSON A | 1 : LONG TERM | EYE |
| | | EYEBROW |
| | | EAR |
| | | NOSE |
| | | MOUTH |
| | 2 : SHORT TERM | HAIR : BROWN, SHORT ; 2005 . 10 . 20 ; AUTOMATIC DELETION : OFF |
| | | EARRING ; 2005 . 9 . 20 ; AUTOMATIC DELETION : ON |
| 2 : PERSON B | 1 : LONG TERM | EYE |
| | | EYEBROW |
| | | EAR |
| | | NOSE |
| | | MOUTH |
| | | MOLE |
| | 2 : SHORT TERM | HAIR : BLACK, LONG ; 25 DAYS REMAINING ; AUTOMATIC DELETION : ON |
| | | CLOTHING COLOR : BLUE ; 1 DAY REMAINING ; AUTOMATIC DELETION : ON |
| | | NECKLACE ; 1 DAY REMAINING ; AUTOMATIC DELETION : ON |
| 3 : PERSON C | 1 : LONG TERM | EYE |
| | | EYEBROW |
| | | EAR |
| | | NOSE |
| | | MOUTH |
| | 2 : SHORT TERM | |

FIG. 7

| REGISTRATION ID (M) | SUBFOLDER (m) | FILE (n) |
|---|---|---|
| 1 : PERSON A | 1 : LONG TERM | EYE |
| | | EYEBROW |
| | | EAR |
| | | NOSE |
| | 2 : SHORT TERM | |
| 2 : PERSON B | 1 : LONG TERM | EYE |
| | | EYEBROW |
| | | EAR |
| | | NOSE |
| | | MOUTH |
| | | MOLE |
| | 2 : SHORT TERM | HAIR : BLACK, LONG ; 25 DAYS REMAINING ; AUTOMATIC DELETION : ON |
| | | CLOTHING COLOR : BLUE ; 1 DAY REMAINING ; AUTOMATIC DELETION : ON |
| | | NECKLACE ; 1 DAY REMAINING ; AUTOMATIC DELETION : ON |
| 3 : PERSON C | 1 : LONG TERM | EYE |
| | | EYEBROW |
| | | EAR |
| | | NOSE |
| | | MOUTH |
| | 2 : SHORT TERM | |

FIG. 8

| REGISTRATION ID (M) | SUBFOLDER (m) | FILE (n) |
|---|---|---|
| 1 : PERSON A | 1 : LONG TERM | EYE |
| | | EYEBROW |
| | | EAR |
| | | NOSE |
| | | MOUTH |
| | 2 : SHORT TERM | HAIR : BROWN, SHORT ; 2005 . 10 . 20 ; AUTOMATIC DELETION : OFF |
| | | EARRING ; 2005 . 9 . 20 ; AUTOMATIC DELETION : ON |
| 2 : PERSON B | 1 : LONG TERM | EYE |
| | | EYEBROW |
| | | EAR |
| | | NOSE |
| | | MOUTH |
| | | MOLE |
| | 2 : SHORT TERM | HAIR : BLACK, LONG ; 25 DAYS REMAINING ; AUTOMATIC DELETION : ON |
| | | CLOTHING COLOR : BLUE : 1 DAY REMAINING ; AUTOMATIC DELETION : ON |
| | | NECKLACE ; 1 DAY REMAINING ; AUTOMATIC DELETION : ON |
| 3 : PERSON C | 1 : LONG TERM | EYE |
| | | EYEBROW |
| | | EAR |
| | | NOSE |
| | | MOUTH |
| | 2 : SHORT TERM | |

IMAGE PROCESSING APPARATUS AND METHOD

BACKGROUND OF THE INVENTION

1. Field of the Invention

The present invention relates to an image processing apparatus and a method, and more particularly to an image processing apparatus and a method which identify an object within an image obtained by image sensing.

2. Description of the Related Art

There has conventionally been known a technology in which general feature information of certain individuals' faces is previously registered in a memory or the like and a human face is extracted from a sensed image using the feature information (for example, refer to Japanese Patent Laid-Open No. 11-175730). In the extraction method which is described in Japanese Patent Laid-Open No. 11-175730, a particular object is detected from a sensed image using pattern matching or the like, it is possible to update data which is the base of the pattern matching.

Although a human face is generally extracted from a sensed image in human face recognition described in Japanese Patent Laid-Open No. 11-175730, a further advanced technology is also available, which enables identification of a particular individual from an extracted face. As an example of the technology for recognizing a particular individual, there is a technology described in Japanese Patent Laid-Open No. 2004-320287. In Japanese Patent Laid-Open No. 2004-320287, features specific to a person are extracted from a sensed image of the particular individual as a recognition target to register in advance as feature information, and identification of the individual is performed by comparing the registered feature information with features of an object extracted from a sensed image.

In Japanese Patent Laid-Open No. 2004-320287, the system is configured so as to be able to arbitrarily perform additional registration of features of the object such as a registered person, new registration of features of an unregistered object, deletion of the registered data and the like. In addition, it is proposed that eyeglasses or clothing along with facial features (eyes, pupils, eyebrows, a mouth, and a nose) can be registered in an attempt to improve the rate of recognition. Furthermore, it is described in the patent that if the object having features registered is detected, various settings (an angle of view, AF, AE, or strobe light) are controlled at the time of image sensing, and image processing may be changed depending on the extracted object.

In addition, it has been proposed that information such as a hair style or clothing of a particular individual which is extracted from a sensed image is accumulated thereby extraction accuracy of the particular individual is improved (Japanese Patent Laid-Open No. 2001-084274).

However, as described in Japanese Patent Laid-Open No. 2004-320287 and Japanese Patent Laid-Open No. 2001-084274, although the recognition rate of a particular individual is improved by registering multiple features of the same person, if all of the multiple registered features are extracted from a sensed image to compare with the registered data, it may take a long time to perform image processing. There is a drawback of not being able to utilize features such as eyeglasses, clothing, and hairstyle, since these features are more likely to change with the time compared to facial features such as eyes, pupils, a mouth, and a nose. If the comparison is performed using such information which may change in a short period of time, these methods may lead to lack of productivity and misrecognition in the image processing.

SUMMARY OF THE INVENTION

The present invention has been made in consideration of the above situation, and has as its object to improve the recognition rate and to efficiently perform recognition upon recognizing a particular object in a sensed image.

According to the present invention, the foregoing object is attained by providing an image processing apparatus comprising:

a memory that stores plural kinds of feature information for identifying an object and a period of time, set for each kind of the feature information, for which the feature information is effective in connection with each other;

an extraction unit that extracts a feature from image data; and a matching unit that compares the feature extracted by the extraction unit with the feature information, which is within the set period of time, among the feature information stored in the memory and recognizes an object.

According to the present invention, the foregoing object is attained by providing an image processing method comprising:

a storing step of storing plural kinds of feature information for identifying an object and a period of time, set for each kind of the feature information, for which the feature information is effective in connection with each other;

an extraction step of extracting a feature from image data; and a matching step of comparing the feature extracted in the extraction step with the feature information, which is within the set period of time, among the feature information stored in the storing step and recognizing an object.

Further, features of the present invention will become apparent from the following description of exemplary embodiments with reference to the attached drawings.

BRIEF DESCRIPTION OF THE DRAWINGS

FIG. 7 is a diagram showing an example of feature data according to an embodiment of the present invention;

FIG. 8 is a diagram showing an example of feature data which is obtained by additionally registering features with the feature data shown in FIG. 7 according to an embodiment of the present invention;

DESCRIPTION OF THE EMBODIMENTS

With reference to the accompanying drawings, the best mode for carrying out the present invention will now be described in detail below.

Figure 1:
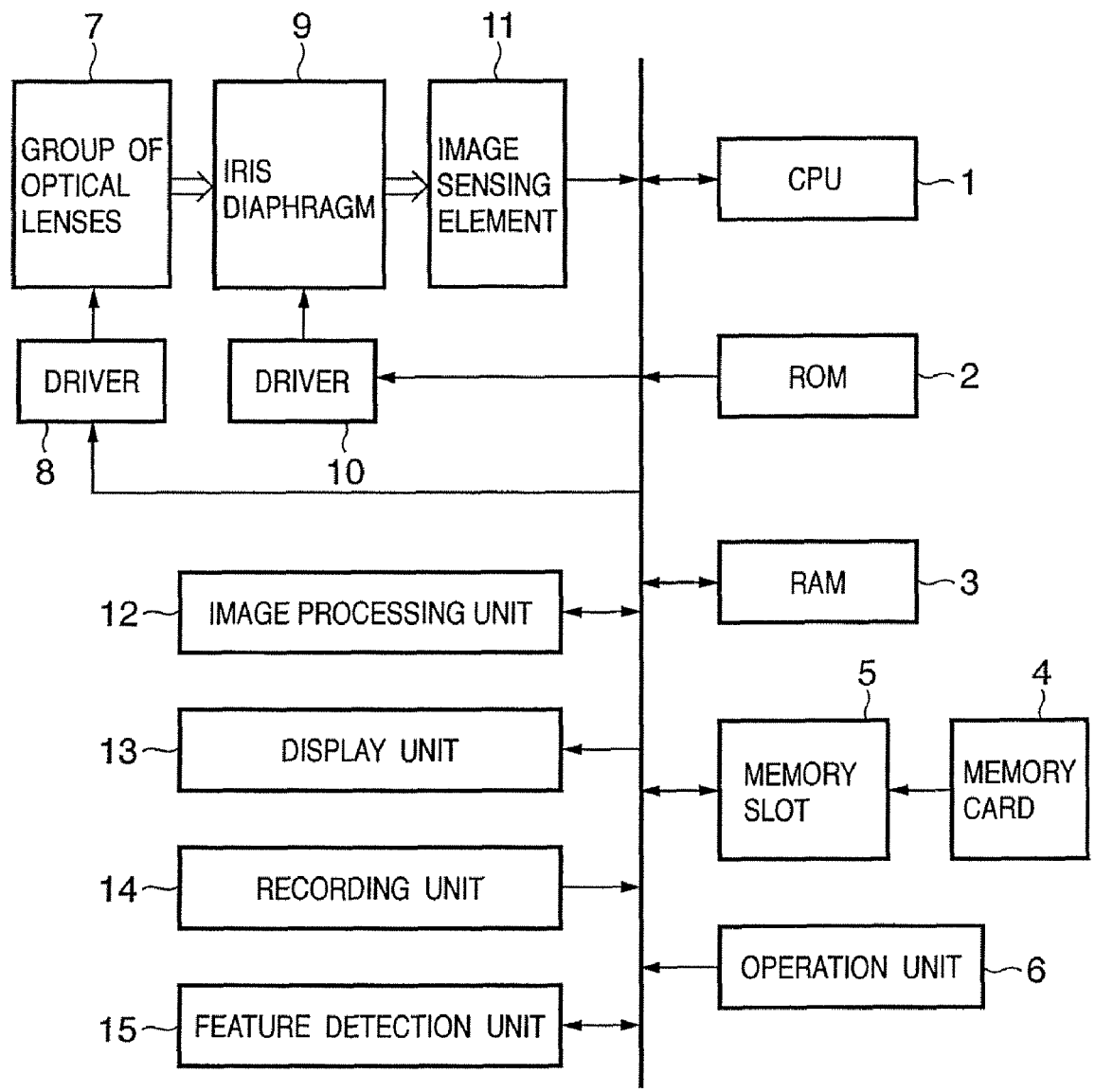
FIG. 1 is a block diagram showing main components of an image sensing apparatus according to an embodiment of the present invention.

FIG. 1 is a block diagram showing main components of an image sensing apparatus according to an embodiment of the present invention. There are a digital camera, digital video camera, and a mobile terminal with a camera (including a mobile telephone with a camera) as the image sensing apparatus, and any image sensing apparatus which can convert an optical image of an object into electrical image signals and outputted the electrical image signals may be used. Note that in this embodiment a case where the image sensing apparatus is a digital camera will be described.

The image sensing apparatus according to the embodiment of the present invention has an object recognition function (a function to identify a particular person or article in an image), and includes an image processing apparatus to provide the object recognition function.

[Configuration of Image Sensing Apparatus]

In FIG. 1, reference numeral 1 denotes a CPU which controls the entire apparatus, reference numeral 2 denotes a ROM which stores procedures (programs) of the CPU 1 or various types of data, and reference numeral 3 denotes a RAM which is used as a work area of the CPU 1. A sensed image is temporarily stored in the RAM 3. Reference numeral 4 denotes a memory card which is a removable storage medium, and reference numeral 5 denotes a memory slot for electrically connecting the memory card 4 to the image sensing apparatus. Reference numeral 6 denotes an operation unit having operation buttons such as a shutter button. The shutter button is configured to have three states: a released state in which a switch is turned off, a half-pressed state in which a switch SW1 is turned on, and a full-pressed state in which both of the switch SW1 and a switch SW2 are turned on. The operation unit 6 also includes, other than the shutter button, up, down, left, and right direction keys (or a cross key), for example, which is used for selecting menu items displayed on a display unit 13, and a set key to fix a selection state.

Reference numeral 7 denotes a group of optical lenses including a zoom lens and a focus lens, reference numeral 8 denotes a driver which drive the focus lens or the zoom lens of the group of optical lenses 7 to control focusing and zooming, reference numeral 9 denotes an iris diaphragm, and references numeral 10 denotes a driver for the iris diaphragm 9. Reference numeral 11 denotes an image sensing element such as a CCD or a CMOS sensor which has a photoelectric conversion function for converting an optical image formed through the group of optical lenses 7 and the iris diaphragm 9 into electrical signals.

Reference numeral 12 denotes an image processing unit for performing various types of image processing. The image processing which is performed here includes an optical black removal process, a white balance process, compression encoding, decoding, or the like. Reference numeral 13 denotes a display unit which displays the sensed image and various types of menus. Reference numeral 14 denotes a recording unit which is a nonvolatile memory to register data of extracted features and to store adjustment data of the camera. Reference numeral 15 denotes a feature detection unit which extracts features of a person from the image signals outputted from the image processing unit 12 and compares between the extracted features and the registered feature data. The CPU 1 provides a function as an image processing device which executes an object recognition function based on the features extracted by the feature detection unit 15 and the feature data stored in the recording unit 14 according to the programs stored in the ROM 2.

[Image Sensing Process]

Figure 2:
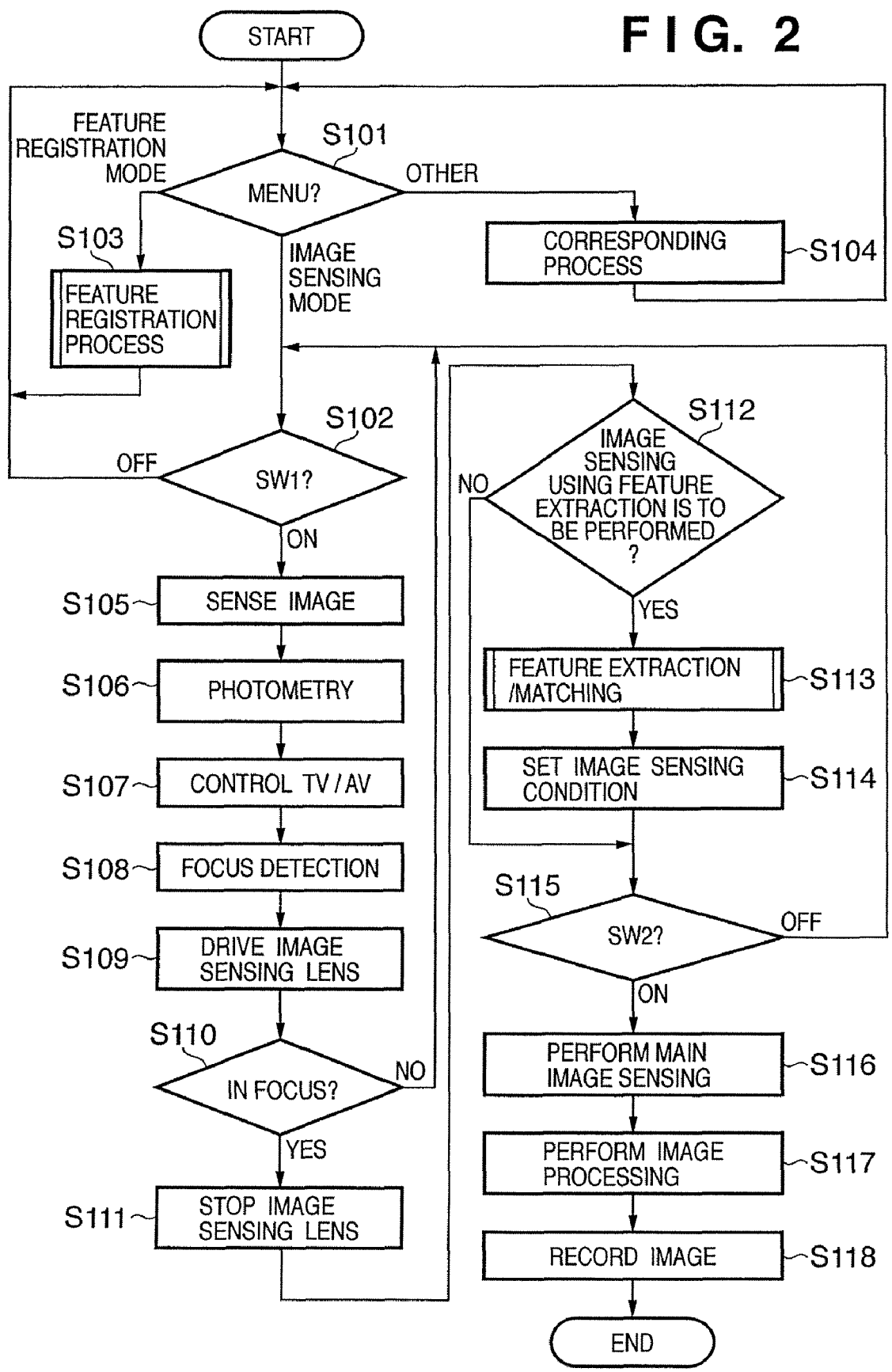
FIG. 2 is a flow chart showing an image sensing process according to the embodiment of the present invention.

FIG. 2 is a flow chart showing a flow of an image sensing process using a feature extraction function in accordance with an embodiment of the present invention.

First, a selection state of a menu displayed on the display unit 13 is checked (step S101), and if the selection state is set to an image sensing mode, the process proceeds to step S102, and if the selection state is set to a feature registration mode, the process proceeds to step S103. The detail of a feature registration process which is performed in step S103 will be hereinafter described with reference to FIG. 3 and FIG. 4. In addition, if the selection state is set to a mode other than the image sensing mode and the feature registration mode (for example, a playback mode etc.), the process proceeds to step S104 where the corresponding process is performed and the process returns to step S101.

In the case of the image sensing mode, in step S102 the state of the switch SW1 which is turned on in the half-pressed state of the shutter button is checked, and if SW1 is on, the process proceeds to step S105, and if SW1 is off, the process returns to step S101. In step S105, the image sensing element 11 starts sensing an image, and photometry is performed based on the obtained sensed image (step S106). In addition, shutter speed Tv and an aperture value Av are set based on a photometric value which is obtained by the photometry (step S107), thereby proper exposure is achieved at the next image sensing operation.

Next, in step S108, a focus detection process is performed. In the digital camera, generally, high frequency components of the sensed image are extracted, and an image sensing lens is driven so as to maximize the contrast of the image (step S109). Note that the focus detection process is not limited to this method, and other method well known in the art may be used. After driving the lens, the focus state is determined, and if it is determined that in-focus state has not been achieved (NO in step S110), then the process returns to step S102 where the same sequence is repeated. If it is determined that in-focus state has been achieved (YES in step S110), then the process proceeds to step S111 where the drive of the image sensing lens is stopped and focus is locked.

Next, in step S112, user setup information about whether feature extraction from the sensed image is to be performed or not is checked, and if the feature extraction is set to be performed, then the process proceeds to step S113, and if the feature extraction is not set to be performed, then the process proceeds to step S115. In step S113, the feature extraction from the obtained image and matching between the extracted features and the feature data retained in the recording unit 14 are performed, and in step S114, an image sensing condition is set depending on the registered individual information. It should be noted that the feature extraction and matching processes performed in step S113 will be described later with reference to FIG. 9 and FIG. 10. Because the process to customize image sensing conditions (an angle of view, focus control point selection, exposure, red-eye reduction etc.) depending on the detected individual information in step S114 is the process which is described in Japanese Patent Laid-Open No. 11-175730, for example, its detailed description is omitted.

Next, in step S115, the state of switch SW2 which is turned on in the full-pressed state of the shutter button is checked. If SW2 is off, then the process returns to step S102, whereas if SW2 is on, then the process proceeds to step S116.

In step S116, main image sensing is performed. After performing predetermined image processing by the image processing unit 12 to the obtained sensed image (step S117), the image is recorded in the memory card 4 which is connected to the memory slot 5 (step S118), and then the image sensing operation is completed.

[Feature Registration Process]

Figure 3:
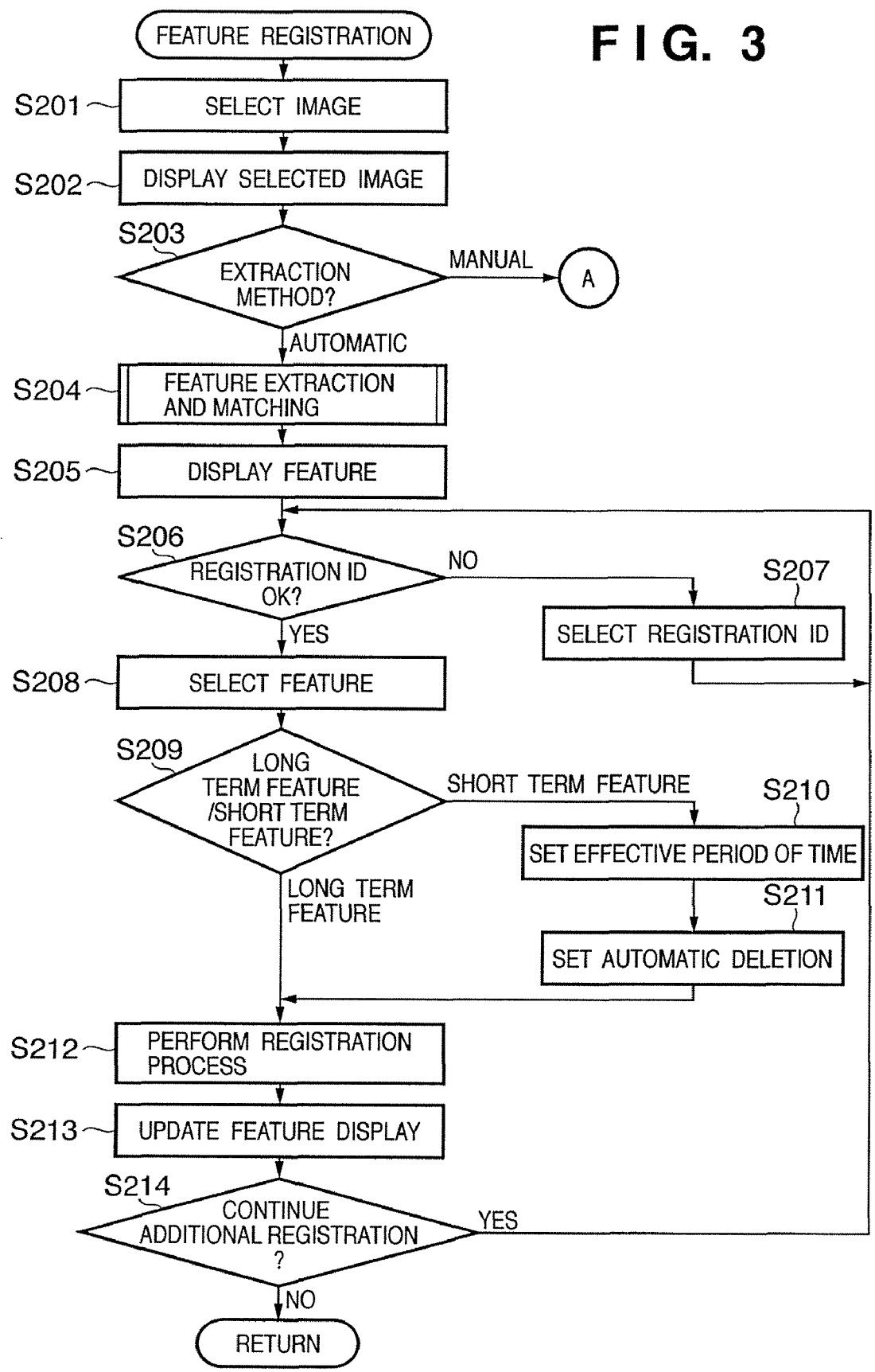
FIG. 3 is a flow chart showing a feature registration process according to the embodiment of the present invention.
Figure 4:
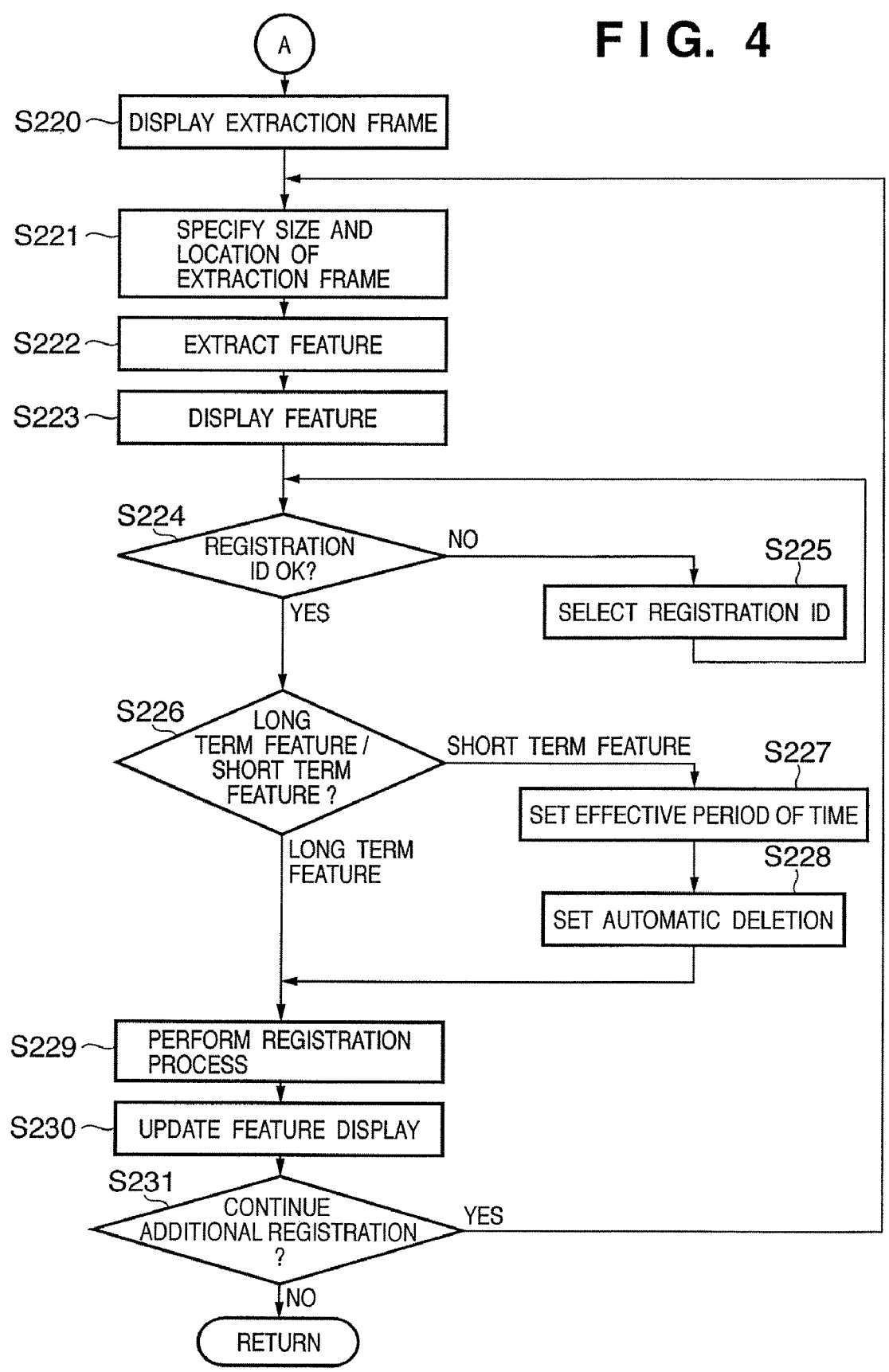
FIG. 4 is a flow chart showing the feature registration process according to the embodiment of the present invention.

FIG. 3 and FIG. 4 are flow charts describing the detail of the feature registration process which is performed in step S103 of FIG. 2. The feature registration process will now be described below with reference to FIG. 3 and FIG. 4.

Figure 5:
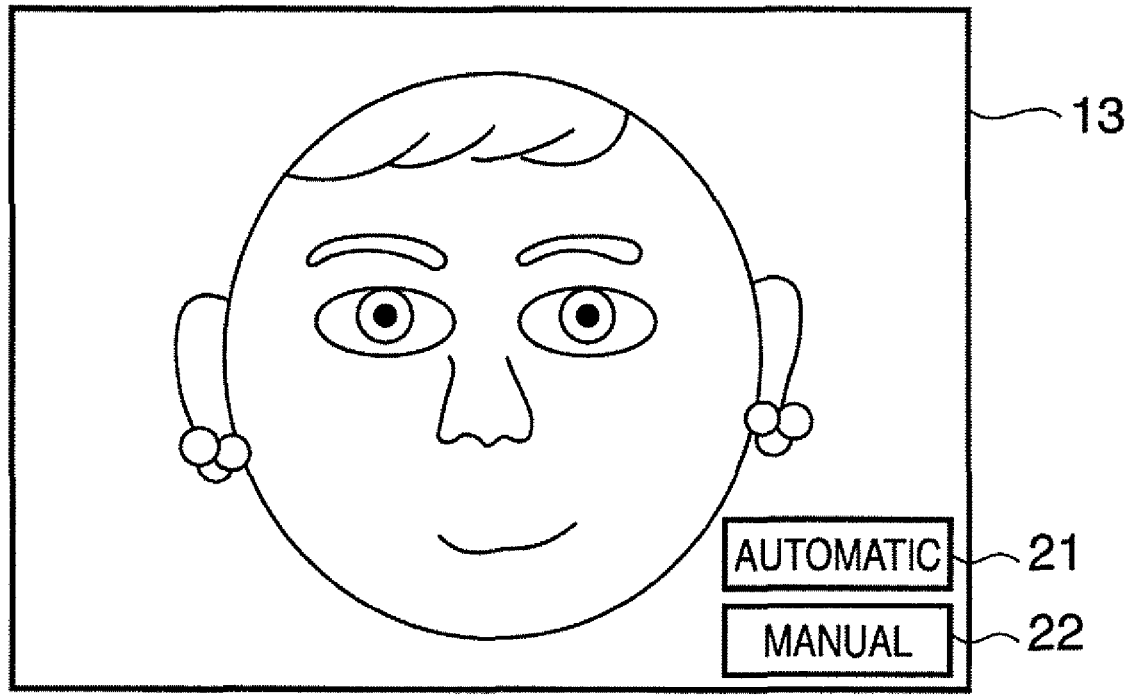
FIG. 5 is a diagram showing an exemplary display of a selected image at a time of the feature registration process according to the embodiment of the present invention.

When the feature registration mode is selected by, for example, operating the direction key of the operation unit 6 on the menu displayed on the display unit 13, the image recorded in the memory card 4 is displayed on the display unit 13. Next, the image from which features to are to be registered is selected among the displayed images (step S201). The desired image can be selected here by displaying thumbnail images of selection candidate images on the display unit 13 and selecting one of the thumbnail images using the direction keys of the operation unit 6, or by operating the direction keys and sending full screen displayed images one image by one image on the display unit 13. Then, the selected image is displayed on the display unit 13 (step S202). Here, instead of selecting the image from the images recorded in the memory card 4 in step S201, image of an object whose features are to be registered may be sensed on the spot. By sensing the object is performed on the spot, the image having the latest features of the object can be obtained. FIG. 5 is a diagram showing an exemplary display of a selected image. According to the embodiment of the present invention, it is possible to select whether the feature extraction is performed automatically or manually. As shown in FIG. 5, an automatic button 21 for selecting automatic extraction and a manual button 22 for selecting manual extraction are displayed along with the image. In step S203, it is determined which of the automatic button 21 or the manual button 22 is selected. If the automatic extraction is selected, then the process proceeds to step S204, and if the manual extraction is selected, then the process proceeds to step S220 of FIG. 4.

First, the case where the automatic extraction is selected will be described.

In step S204, a feature extraction/matching process similar to the process which is performed in step S113 of FIG. 2 is performed. The process performed here will be described later in detail with reference to FIG. 9 and FIG. 10, but is described simply in the following. First, features (for example, in the case of a face, eyes, a nose, eyebrows, ears, a mouth, hair style, eyeglasses, etc.) are extracted from the image selected in step S202 by using the method well known in the art. Next, among the extracted features, specific features which are not likely to change in the short term (in the exemplary features mentioned above, eyes, a nose, eyebrows, ears, a mouth or the like, hereinafter referred to as "long term features") and the feature data stored in the recording unit 14 are successively matched each other, and the extracted object is identified.

FIG. 7 is a diagram showing exemplary feature data retained in the recording unit 14 and used in step S204, and the feature data represents the data in the case where the objects are persons. In an example shown in FIG. 7, three persons, person A, person B and person C are already registered. Here, for person A and person C only long term features are registered, and for person B both of long term features and features which are likely to change in the short term (hereinafter referred to as "short term features") are registered.

Figure 6A:
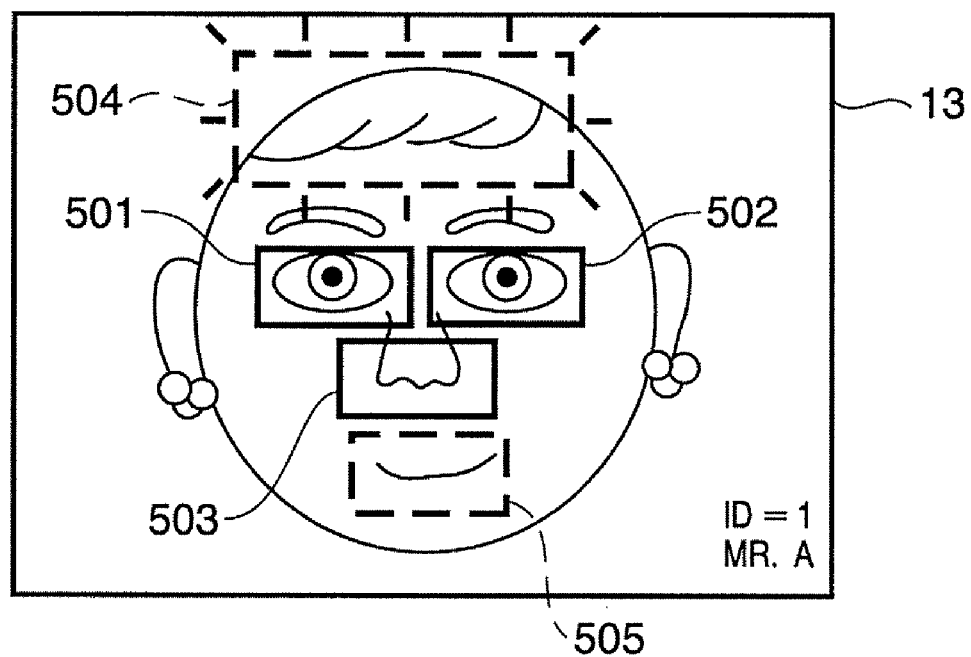
FIGS. 6A and 6B are diagrams showing exemplary displays of feature extraction results at times of the feature registration process according to the embodiment of the present invention.

Next, the features extracted in step S204 are displayed based on the results of the comparison on the display unit 13 (step S205). FIG. 6A is a diagram showing an exemplary display on the display unit 13 in step S205. As shown in FIG. 6A, on an image displayed on the display unit 13 at the time of automatic registration, reference numerals 501, 502, 503, 504 and 505 denote the features which have been automatically extracted. Among these features, the eyes 501 and 502, and the nose 503 shown by solid line frames represent features which have been already registered in the recording unit 14 as the feature data, and the hair 504 and the mouth 505 shown by broken line frames represent unregistered features. In addition, the registration ID of the object which has been identified in step S204 and if there is any information, the name of the object are displayed at non-interfering locations on the screen. In addition, in step S204, if these features do not match to any registered object, in other words if it is judged that the object is a new object, all the features are indicated by the broken line frame. In addition, the registration ID is automatically assigned as, for example, "***," "unregistered," or an unused registration ID number and displayed.

In step S206, the process makes a user to determine whether the displayed registration ID is appropriate or not. If the user determines that the displayed registration ID is not appropriate and selects another registration ID, then the process accepts the selected content (step S207), and returns to step S206.

If the displayed registration ID is not changed, then the process proceeds to step S208, and among the unregistered features shown by the broken line frames on the display unit 13 the feature which is newly to be registered is selected by operating the direction keys or the like of the operation unit 6. Regarding the selection method, for example, the method in which unregistered features are in turn selected at each time when the up or down direction key or the left or right direction key is pressed down may be considered, however, other methods can also be used. In the example shown in FIG. 6A, the case where the hair 504 is selected is shown, and the broken line frame is blinked to inform the user that the hair is selected. It should be noted that the way of display is not limited to above and another way of display, such as by changing colors of the frame, may be of course used.

In step S208, when the selection of features to be newly registered is completed, the process makes the user select whether the feature which is desired to register is a long term feature or a short term feature (step S209). As a result, if the long term feature is selected, then the process proceeds to step S212, and if the short term feature is selected, then the process proceeds to step S210.

In the case of the short term feature, a period of time for which the selected feature is effective (referred to as "effective period of time", hereinafter) is set (step S210). In addition, setting for whether automatic deletion is to be performed or not after the set effective period of time has passed is performed (step S211).

Here, regarding the timing of the automatic deletion, features can be deleted by checking the dates when the camera is powered on for example, or when the camera is on, an interruption is generated as the date changes to delete features. Of course the timing of the automatic deletion is not limited to those mentioned above. In addition, in step S211, the automatic deletion may not be set for the features which have the possibility to be used at a later time, and in this case the features are not deleted and may be used again. In this case, the feature whose effective period of time is passed is preferably displayed on the registration screen when the effective period of time is elapsed so as to allow the user to select whether the effective period of time is to be set again or the feature is to be deleted. Also, the apparatus may be configured to notify the user of the short term features whose effective periods of time have elapsed by displaying a warning or the like.

When the process completes step S211, the process proceeds to step S212.

In step S212, the feature selected in step S208 is registered in a folder of the specified feature category (long term feature/short term feature) of a specified registration ID. When the feature is registered, a file name (for example "Hair" in the example shown in FIG. 6A) is generated and stored in the recording unit 14. The file name may be automatically generated, or may be arbitrarily entered by the user. On the other hand, if a short term feature is selected in step S209, the effective period of time set in step S210 is registered along with the presence or absence of the automatic deletion setting set in step S211.

When the registration process completes, the display of the registered feature is changed to registered one (the solid line frame in the example shown in FIG. 6A) (step S213), and the process proceeds to step S214 where it is determined whether an additional registration is to be performed. Here for example, the process determines whether there is an unregistered feature, or makes the user select by displaying a message such as "Continue an additional registration?". Of course, other methods may be used. If the additional registration is continued, the process returns to step S206 where the above mentioned process is repeated, and if the registration process is completed, the feature registration process routine (step S103) is finished.

The manual extraction process will now be described.

If the manual extraction is selected in step S203, the process proceeds to step S220 of FIG. 4 where a feature extraction frame is displayed on the screen on which the selected image is displayed. The displayed frame may be one similar to the display frame during the selection of the unregistered feature described in FIG. 6A. Or color of the frame may be changed so that a user can easily recognize. Then, the user designates the size and the location of the feature extraction frame depending on the size of the feature which the user desires to extract within the selected image (step S221). Here, for specifying the size, the direction key of the operation unit 6 may be used and, for example, the height of the frame is increased by pressing the up direction key, the height of the frame is decreased by pressing the down direction key, the width of the frame is increased by pressing the right direction key, and the width of the frame is decreased by pressing the left direction key. In addition, for specifying the location of the frame, the frame may be moved in the direction indicated by the direction keys of the operation unit 6, for example.

If the size and the location of the feature extraction frame is determined, then feature extraction within the frame is performed in the method well known in the art (step S222), and if the feature extraction is completed, then the feature is displayed (step S223).

Figure 6B:
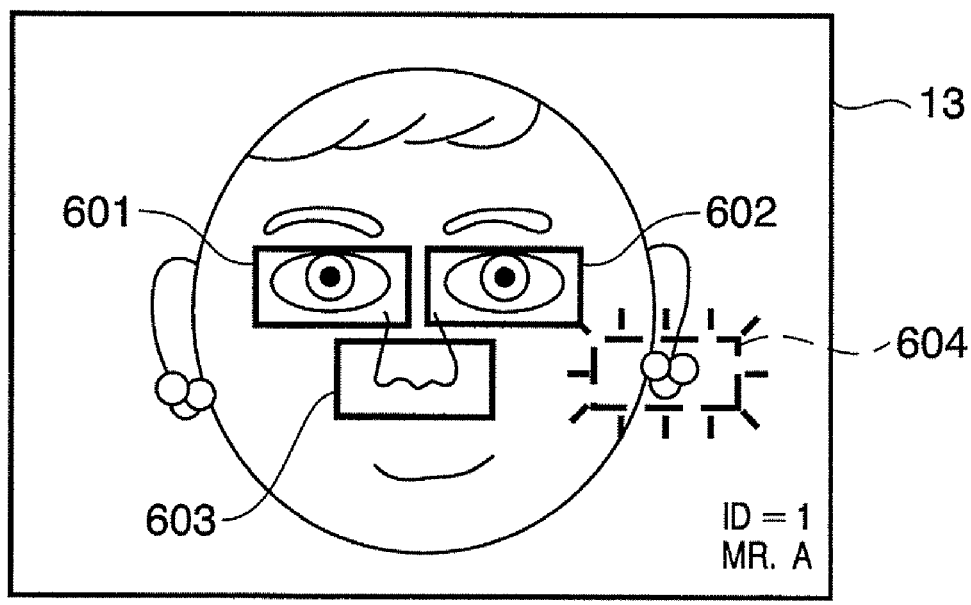

FIG. 6B is a diagram showing an exemplary display on the display unit 13 in step S223. On the display screen in FIG. 6B, reference numerals 601, 602 and 603 denote the features which have been registered by the registration process discussed later, and reference numeral 604 denotes the feature extraction frame specified in step S221. In the example shown in FIG. 6B, the frames of the registered features are represented using solid lines, and the feature extraction frame 604 containing the feature to be performed is represented using broken lines and is blinked to inform the user that the feature is selected. Note that the way of display is not limited to above and another way of display, such as changing colors of the frame, may be of course used.

Next, a registration ID to which a feature to be newly registered is registered is selected. If the feature extraction and registration has been performed before (i.e., if the current loop is the second or later round loop), a registered ID used at the time of previous registration is displayed at a non-interfering location on the screen. If the registration ID is acceptable (YES in step S224), the process proceeds to step S226. On the other hand, if the current loop is the first loop, the registration ID is not yet determined. In this case, step S224 results in NO, and the process proceeds to step S225 where a registration ID is selected, and the process proceeds to step S226.

Because each process of the steps from step S226 to step S229 is similar to each process of the steps from step S209 to S212, the description is omitted.

When the registration is finished, in step S230, the display of the frame for the feature to be registered is changed to the display for the registered feature (the solid line frame in the example shown in FIG. 6B). Then in step S231 it is determined whether an additional registration is continued. For example, the process is adapted to make the user select here by displaying a message such as "Continue an additional registration?" etc. Of course other methods may be used. If the additional registration is continued, the process returns to step S220 where a new extraction frame is displayed, and if the additional registration is not continued, then the feature registration process is finished.

The feature registration process is completed by performing the above mentioned process.

FIG. 8 shows an example in which the feature of the "mouth" as the long term feature and the features of the "hair" and the "earring" as the short term features for Mr. A are added to the feature data which had the state shown in FIG. 7. It should be noted that applied to the image selected in step S202 may be either the automatic extraction or the manual extraction, or both of the automatic extraction and the manual extraction performed in turn or alternately.

Note that although the features of the hair and the accessory are shown as the short term features, the present invention is not limited to these features, and the features which change in the short term, such as eyeglasses and clothing, may be used, and therefore various kinds of short term features may be considered.

[Feature Extraction/Matching Process]

Figure 9:
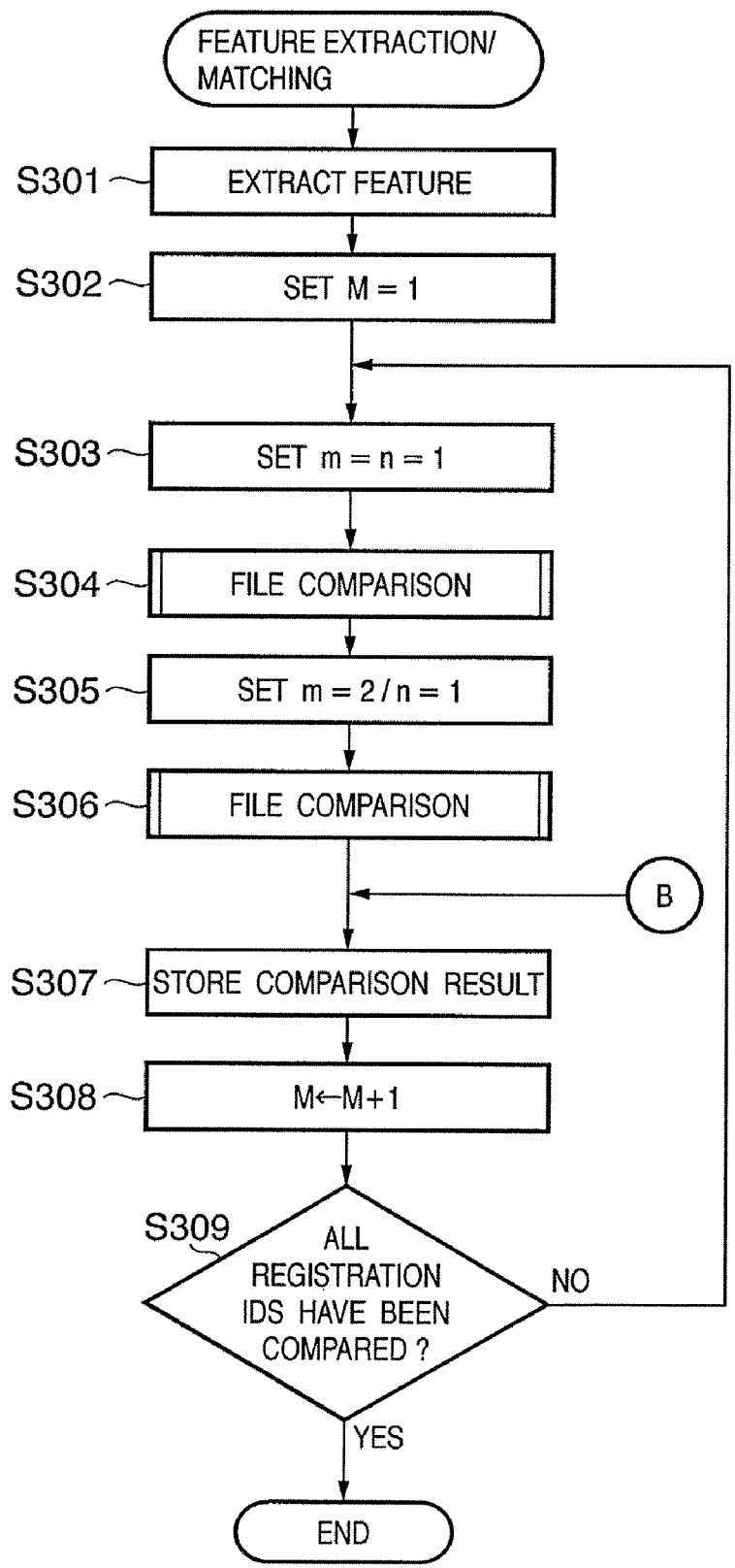
FIG. 9 is a flow chart showing a feature extraction/matching process according to the embodiment of the present invention.
Figure 10:
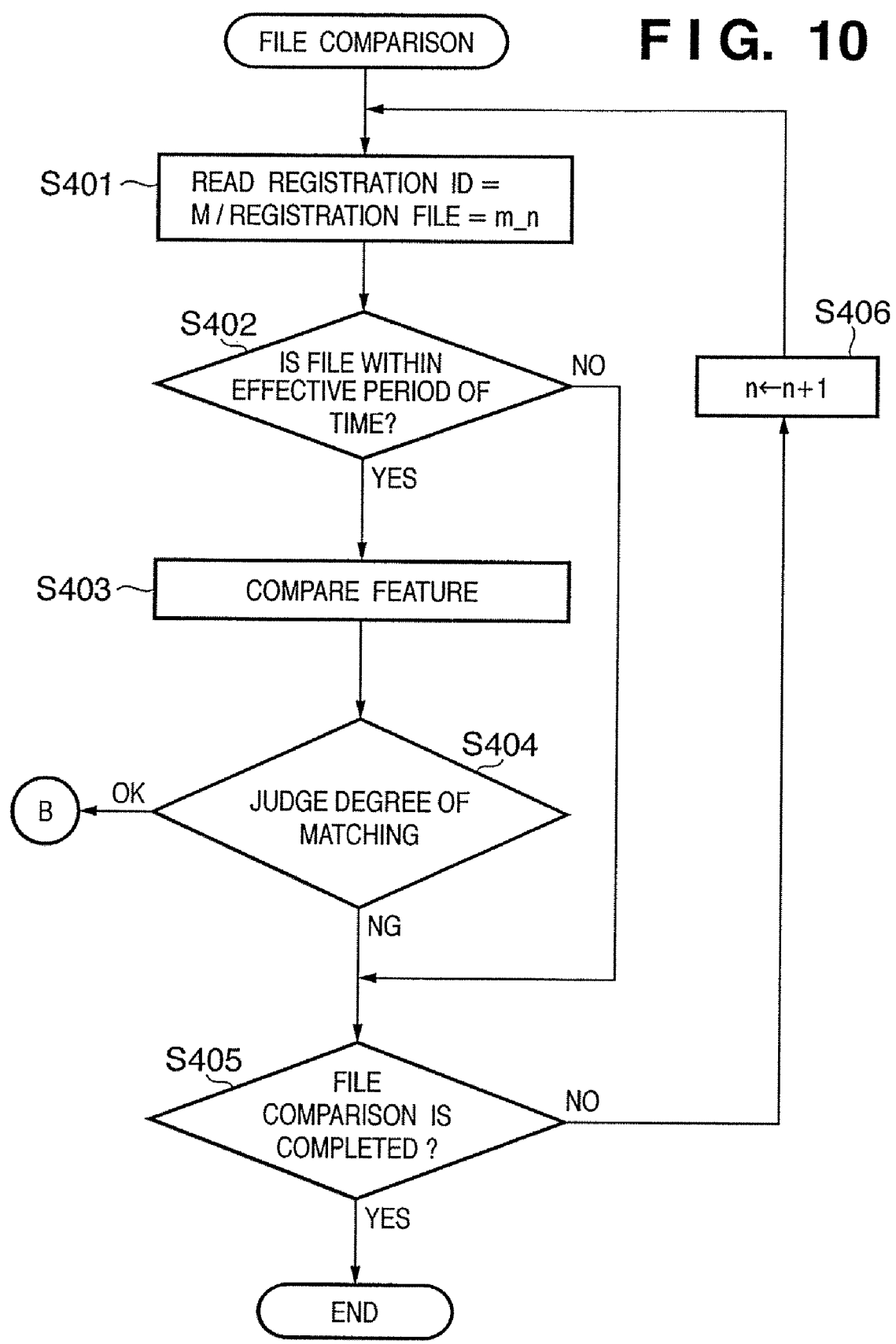
FIG. 10 is a flow chart showing a file matching process according to the embodiment of the present invention.

FIG. 9 and FIG. 10 are flow charts describing in detail the feature extraction/matching process which is performed in step S113 of FIG. 2 and step S204 of FIG. 3. The feature extraction/matching process will now be described below with reference to FIG. 9.

First, feature extraction is performed to the image obtained immediately after the image sensing lens is stopped in step S111 of FIG. 2, or to the image selected in step S201 of FIG. 3 (step S301). Note that the method of feature extraction performed here may be a method well known in the art. Next, in order to match the extracted feature to the feature data as shown in FIG. 8, the registration ID is initialized (step S302). In the embodiment of the present invention, the registration ID is represented by a variable M, and in step S302 M is initialized to 1.

Next, in order to perform a file search within the registration ID, a subfolder and a file number are specified (step S303). In the embodiment of the present invention, the subfolder is represented by a variable m, and the file is represented by a variable n. Note that the subfolder represents folders which contain the long term features or the short term features, and the variable m takes a value of 1 or 2. The file represents information of a feature classified into each subfolder. Note that the method to specify the registration ID, the subfolder, and the file is not limited to above. In step S303, the variables m and n are set to initial value 1.

Next, the file specified by the variable n is read from the subfolder specified by the variable m=1 (the subfolder of the long term features in the example of the feature data shown in FIG. 8) to compare with the extracted feature (step S304). This file comparison process is described later with reference to FIG. 10, and is continued until all effective files within the subfolder having m=1 or long term features in the registration ID specified by the variable M are compared with the extracted feature. When the comparison with all the files is completed, the process proceeds to step S305. However, if the feature extraction/matching process is performed from step S204 of FIG. 3, because the comparison with the subfolder of the short term features is not performed, the processes from step S305 to step S306 are skipped and the process proceeds to step S307.

In step S305, because the comparison with all the files in the subfolder of long term features has been completed, the subfolder specifying variables m is changed to 2 or the subfolder of short term features is specified, and the variable n for specifying a file is initialized to 1. Then in step S306, the effective files in the subfolder of short term features specified in step S305 are successively compared. Also in step S306, comparison is performed in a procedure shown in FIG. 10, and is continued until comparison with all effective files within the subfolder of the short term features is performed. When the comparison with all the files is completed, the process proceeds to step S307 where the comparison result is stored in the RAM 3.

Next, the variable M for specifying the registration ID is incremented (step S308), and it is determined whether the specified variable M is larger than the number of registration IDs or whether the comparison is completed for all the registration IDs (step S309). If the comparison is not completed (NO in step S309), the process returns to step S303 where the comparison with the files of the next registration ID is performed. In such a manner, the files of the registration ID are successively compared. When comparison of all the files of all the registration IDs is completed, in step S310 the object is identified based on the comparison results stored in step S307, and the feature extraction/matching subroutine (step S113, S204) is completed.

Note that the comparison results stored in step S307 are used for the purpose of setting of the image sensing condition or the like in step S114, and are reflected on the main image sensing in the case where the switch SW2 is turned ON.

Next, the file comparison process which is performed in step S304 and step S306 of FIG. 9 will be described with reference to FIG. 10.

First, a file, which is specified by the variable n within the subfolder specified by the variable m for the registration ID specified by the variable M, is read (step S401). Next, the effective period of time of the read file is judged (step S402). If the effective period of time is stored in the file, the judgement is performed based on the effective period of time, and if the effective period of time is not stored in the file, the file is judged to be within the effective period of time. If the effective period of time is passed, the process proceeds to step S405 without performing the comparison with the read file.

If the file is within the effective period of time, the comparison between the extracted feature and the feature information of the read file is performed (step S403), and the judgment of the comparison result (degree of matching) is performed (step S404). If the degree of matching between the extracted feature and the feature information of the read file is insufficient, then the process proceeds to step S405, and if the degree of matching is sufficient to be able to identify the object, then the process proceeds to step S307 of FIG. 9. In other words, if the object can be identified with adequate accuracy only based on the comparison with the files of the subfolder with m=1 (subfolder of the long term features), step S305 and S306 are not performed. More specifically, because the comparison with the files registered in the subfolder of m=2 (subfolder of the short term features) is not performed, recognition of the object is efficiently performed while maintaining recognition accuracy of the object.

In step S405, it is determined whether comparisons to all the files within the subfolder specified by the variable m are completed, and if all are completed, this subroutine is finalized. In other words, if m=1 holds true, the process proceeds to step S305 of FIG. 9, and if m=2 holds true, the process proceeds to step S307. On the other hand, if the comparisons to all the files have not been completed, then, after the variable n is incremented in step S406, the process returns to step S401 where the comparison to the next file is continued.

In such a manner, in the file comparison process, the comparison of the extracted feature is continued until the object can be identified, or until the comparisons with all the files in the subfolder are completed.

According to the embodiment of the present invention as described above, the features are separately registered for the long term features which are not likely to change in the short term and for the short term features which are likely to change in the short term, and an effective period of time is set for each of the short term features. Accordingly, if the time period from the registration of features to the execution of recognition of the sensed object is short, the recognition rate of the object can be improved by utilizing the short term features. In addition, if the time period from the registration of features to the execution of recognition of the sensed object is long, the recognition rate of the object can be improved and the reduction of the processing speed can be prevented by not utilizing the short term features which are likely changed.

In addition, in the embodiment mentioned above, although the case where the long term features and the short term features are registered in different subfolders and the long term features are compared in high priority is described, the long term features and the short term features may not necessarily be classified. Even in the case, because the effective period of time is set for the short term feature, the comparison with the expired feature is prevented based on the judgment of the effective period of time in step S402 of FIG. 10. Therefore, the recognition rate can be improved. Thus, although the recognition speed of the object is lower than the case where the long term features and the short term features are classified, the more efficient recognition can be performed compared with the case where comparisons with all the registered features are performed.

In the embodiment mentioned above, although the effective periods of time are set only for the short term features, however, because even the long term features such as eyes, a nose, eyebrows, ears or a mouth may change as time elapses, the expiration date may be also set for the long term feature. The effective period of time of the short term feature may be a short term such as a day, a week, or a period up to the time when the image sensing apparatus is powered off, whereas the effective period of time of the long term feature may be set by unit of year. Although the effective period of time of the long term feature may be configured to be set by the user, the configuration in which the expiration date is automatically set by unit of year will provide more excellent usability. Thus the embodiment described above is characterized in that the different effective periods of time are set for respective types of features. Note that the effective periods of time described herein include the case where no specific expiration date is designated and the expiration date is substantially indefinite.

Other Embodiments

Note that the present invention can be applied to an apparatus comprising a single device (e.g., digital still camera, digital video camera) or to system constituted by a plurality of devices (e.g., host computer, interface, camera head).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-270407, filed on Sep. 16, 2005, which is hereby incorporated by reference herein in its entirety.

What is claimed is:

1. An image processing apparatus comprising:
   an extraction unit that extracts a feature from image data;
   a memory that stores personal feature information including short term feature information to which a validity period of time is set and long term feature information to which a validity period of time is not set;
   a matching unit that compares the feature extracted by said extraction unit with the personal feature information stored in said memory to obtain a comparison result used to recognize a person having the extracted feature; and
   a control unit that sets a feature registration mode for updating the personal feature information stored in said memory by registering at least one of new short term feature information or new long term feature information,
   wherein, in a case where the feature registration mode is not set, said matching unit compares the feature extracted by said extraction unit with the long term feature information and the short term feature information within the set validity period of time and uses the comparison result to recognize the person having the extracted feature, and
   wherein, in a case where the feature registration mode is set, said matching unit compares the feature extracted by said extraction unit only with the long term feature information and uses the comparison result to recognize the person having the extracted feature even if the short term feature information within the set validity period of time exists.

2. The image processing apparatus according to claim 1, further comprising:
   a judgment unit that judges whether the set validity period of time of the short term feature information stored in said memory has elapsed; and
   a deletion unit that deletes the short term feature information whose set validity period of time has elapsed from the memory.

3. The image processing apparatus according to claim 1, further comprising:
   a judgment unit that judges whether the set validity period of time of the short term feature information stored in said memory has elapsed; and
   a warning unit that warns expiration of the short term feature information whose set validity period of time has elapsed.

4. The image processing apparatus according to claim 1, wherein said matching unit gives a priority to the long term feature information upon comparing a feature extracted by said extraction unit with feature information, and performs comparison with the short term feature information if an object could not be recognized by comparing with the long term feature information.

5. The image processing apparatus according to claim 1, further comprising:
   an image sensing unit that performs photoelectric conversion of light from an object to output electrical image data; and
   an image sensing condition controller that controls an image sensing condition used in said image sensing unit based on a recognition result of an object by said matching unit.

6. An image processing method comprising:
   an extraction step of extracting a feature from image data;
   a storing step of storing in a memory personal feature information including short term feature information to which a validity period of time is set and long term feature information to which a validity period of time is not set;
   a matching step of comparing the feature extracted in said extraction step with the feature information stored in said storing step so as to obtain a comparison result used in recognizing a person having the extracted feature; and
   a control step of setting a feature registration mode for updating the personal feature information stored in said memory by registering at least one of new short term feature information or new long term feature information,
   wherein, in a case where the feature registration mode is not set, said matching step compares the feature extracted by said extraction step with the long term feature information and the short term feature information within the set validity period of time and uses the comparison result to recognize the person having the extracted feature, and
   wherein, in a case where the feature registration mode is set, said matching step compares the feature extracted by said extraction step only with the long term feature information and uses the comparison result to recognize the person having the extracted feature even if the short term feature information within the set validity period of time exists.

7. The image processing method according to claim 6, further comprising:
   a judging step of judging whether the set validity period of time of the short term feature information stored in said storing step has elapsed; and
   a deletion step of deleting the short term feature information whose set validity period of time has elapsed.

8. The image processing method according to claim 6, further comprising:
   a judging step of judging whether the set validity period of time of the short term feature information stored in said storing step has elapsed; and
   a warning step of warning expiration of the short term feature information whose set validity period of time has elapsed.

9. The image processing method according to claim 6, wherein, in said matching step, a priority is given to the long term feature information upon comparing a feature extracted in said extraction step with the feature information, and comparison with the short term feature information is performed if an object could not be recognized by comparing with the long term feature information.

10. The image processing method according to claim 6, further comprising:
    an image sensing step of performing photoelectric conversion of light from an object to output electrical image data; and
    a step of controlling an image sensing condition in said image sensing step based on a recognition result of an object by said matching step.

11. A non-transitory storage medium readable by an information processing apparatus, said storage medium storing a program which is executable by the information processing apparatus and comprises program codes realizing the image processing method described in claim 6.

* * * * *